(12) United States Patent  (10) Patent No.: US 6,452,668 B1
Pratt  (45) Date of Patent: Sep. 17, 2002

(54) ROTATING HEAD OPTICAL TRANSMITTER FOR POSITION MEASUREMENT SYSTEM

(75) Inventor: Timothy Pratt, Blacksburg, VA (US)

(73) Assignee: ARC Second, Inc., Dulles, VA (US)

( * ) Notice: Subject to any disclaimer, the term of this patent is extended or adjusted under 35 U.S.C. 154(b) by 0 days.

(21) Appl. No.: 09/417,112

(22) Filed: Oct. 13, 1999

Related U.S. Application Data

(60) Provisional application No. 60/104,115, filed on Oct. 13, 1998, and provisional application No. 60/125,545, filed on Mar. 22, 1999.

(51) Int. Cl.$^7$ .................. G01B 11/26; H04B 10/04
(52) U.S. Cl. .................. 356/141.4; 359/180
(58) Field of Search .......... 356/141.1, 141.4, 356/141.5, 152.1; 702/150–153; 359/180

(56) References Cited

U.S. PATENT DOCUMENTS

| | | | |
|---|---|---|---|
| 3,865,491 A | * | 2/1975 | Hogan |
| 4,441,809 A | | 4/1984 | Dudley et al. |
| 4,674,870 A | * | 6/1987 | Cain et al. |
| 4,818,107 A | | 4/1989 | Ono et al. |
| 4,820,041 A | | 4/1989 | Davidson et al. |
| 4,874,238 A | | 10/1989 | Ochi et al. |
| 5,100,229 A | | 3/1992 | Lundberg et al. ............ 356/4 |
| 5,110,202 A | | 5/1992 | Dornbusch et al. ............ 356/1 |
| 5,247,487 A | | 9/1993 | Beliveau et al. ............ 367/99 |
| 5,294,970 A | | 3/1994 | Dornbusch et al. ......... 356/152 |
| 5,307,368 A | | 4/1994 | Hamar |
| 5,461,473 A | | 10/1995 | Pratt et al. ............... 356/141.3 |
| 5,579,102 A | | 11/1996 | Pratt et al. ............... 356/3.12 |
| 5,953,108 A | * | 9/1999 | Falb et al. ............... 356/4.08 |
| 6,035,540 A | * | 3/2000 | Wu et al. ................ 33/286 |

* cited by examiner

Primary Examiner—Stephen C. Buczinski
(74) Attorney, Agent, or Firm—Steven L. Nichols, Esq.; Paul W. Fish, Esq.; Rader, Fishman & Grauer PLLC

(57) ABSTRACT

An optical transmitter for use in position location or position measurement systems includes (i) an assembly including two optical sources that generate two optical beams which diverge in known ways in a first and second plane, respectively, and are narrow in the orthogonal planes, (ii) a power source which provides power to the assembly to rotate it at a constant angular velocity or with a previously known pattern of velocities through each complete rotation of the assembly, and (iii) a signaling unit that emits a synchronization signal at a specific rotational position of the assembly. The optical transmitter can be used in systems for determining points, lines, planes, distances, areas, volumes, azimuth, elevation, range, angles, or any other positional or spatial variable. The optical transmitter has wide application in, for example, surveying, construction, and the creation of virtual or real environments.

40 Claims, 4 Drawing Sheets

ROTATING HEAD OPTICAL TRANSMITTER FOR POSITION MEASUREMENT SYSTEM

CROSS-REFERENCE TO RELATED APPLICATIONS

This application claims the priority of previously filed provisional application number 60/104,115 assigned to the present assignee and filed on Oct. 13, 1998, and previously filed provisional application number 60/125,545 assigned to the present assignee and filed on Mar. 22, 1999, which are both hereby fully incorporated as if fully set forth herein.

BACKGROUND OF THE INVENTION

1. Field of the Invention

The present invention relates to optical transmitters. More specifically, the present invention relates to optical transmitters that generate at least one rotating optical beam and that can be used in a position location system.

2. Description of the Related Art

Local area position measurement systems have been developed that will quickly and accurately generate digitized three-dimensional position data. For example, U.S. Pat. Nos. 5,100,229, 5,110,202, 5,247,487, and 5,294,970, the contents of which are hereby incorporated by reference, describe such position measurement systems. Each position measurement system includes one or more optical transmitters that transmit substantially planar laser beams. Each system also includes a portable position sensor that detects the laser beams. As explained in detail in the above-mentioned patents, digitized three-dimensional position data indicating the location of the position sensor can be generated based on time intervals defined by the detection of the laser beams by the position sensor.

Accurate position measurement with these systems requires accuracy in the generation of optical beams. More specifically, each of the optical beams must have a constant and known shape and a constant angular velocity, or a known pattern of angular velocities through each complete revolution of the beams, as it is rotated through space about a rigidly mounted axis by a drive system. Consequently, the optical transmitters must be designed and manufactured with considerable care. Any unknown variation in the shape or velocity of the laser beams as they rotate degrades the accuracy of the position location system.

U.S. Pat. Nos. 5,461,473 and 5,579,102, the contents of which are hereby incorporated by reference, disclose an optical transmitter that will generate the optical beams used in the above-mentioned position measurement systems. As shown in FIG. 4, a laser emitter 112 generates a collimated laser beam that passes through the center of a spindle shaft 118 and is incident on a prism assembly 108, which divides the collimated laser beam into two laser beams. Each laser beam diverges along a plane but remains vary narrow in a direction orthogonal to the plane. Thus, the laser beams are considered substantially planar. A drive motor 116 rotates the spindle shaft 118 and the prism assembly 108 to rotate the laser beams. A roof mirror 122 reflects the laser beams so that they rotate about an axis perpendicular to the rotational axis of the prism assembly 108.

This optical transmitter is impractical for the consumer market because it is uneconomical to manufacture. In particular, the design of the optical transmitter requires many precision optical components that are expensive and difficult to manufacture. In addition, the optical transmitter has a complex optical path, which requires precise mounting and alignment of the optical components to prevent variations in the shape of the laser beams as they rotate. This optical transmitter also is rather large and heavy. Moreover, it requires a large and heavy battery when the transmitter is used in a portable application.

The present invention is directed toward reducing the effects of at least one of the above mentioned problems.

SUMMARY OF THE INVENTION

An embodiment of the present invention is directed toward providing an optical transmitter for use in a position location system that produces optical beams that rotate at a constant angular rate and have a constant shape as the beams are rotated.

An embodiment of the present invention is directed toward providing an optical transmitter for use in a position measurement and location system that can be manufactured efficiently and economically.

An embodiment of the present invention is directed toward providing an optical transmitter that is relatively small and light.

An embodiment of the present invention is directed toward providing an optical transmitter that has sufficient operational efficiency to permit the use of a small and light portable power source.

Additional features and advantages of embodiments of the invention may be apparent from the description that follows. Further advantages of the invention also may be learned by practice of the invention.

Briefly, in accordance with one aspect of the present invention, there is provided an optical transmitter. The optical transmitter includes a rotating head assembly, a rotary power source, and a signaling unit. The rotating head assembly includes a first optical source that generates a first optical beam that is narrow in a first plane and diverges in a known way in an orthogonal plane. The rotary power source is for providing power to rotate the rotating head assembly at one or more known angular velocities. The signaling unit is for emitting a synchronization signal at a specific rotational position of the rotating head assembly.

Briefly, in accordance with another aspect of the present invention, there is provided another optical transmitter. The optical transmitter includes a rotating head assembly and a rotary power source. The rotating head assembly includes a first optical source that generates a first optical beam that is narrow in a first narrow plane and diverges in a first known way in a first orthogonal plane. The rotating head assembly further includes a second optical source that generates a second optical beam that is narrow in a second narrow plane and diverges in a second known way in a second orthogonal plane. The rotary power source is for providing power to rotate the rotating head assembly at one or more known angular velocities.

Briefly, in accordance with another aspect of the present invention, there is provided a method of transmitting an optical signal. The method includes (i) providing a rotating head assembly having a first optical source, (ii) generating, with the first optical source, a first optical beam that is narrow in a first plane and diverges in a known way in an orthogonal plane, (iii) rotating the rotating head assembly, and (iv) emitting a synchronization signal at a specific rotational position of the rotating head assembly.

Briefly, in accordance with another aspect of the present invention, there is provided another method of transmitting an optical signal. The method includes (i) providing a rotating head assembly having a first optical source and a second optical source, (ii) generating, with the first optical source, a first optical beam that is narrow in a first plane and diverges in a first known way in an orthogonal plane, (iii) generating, with the second optical source, a second optical beam that is narrow in a second plane and diverges in a second known way in a second orthogonal plane, and (iv) rotating the rotating head assembly.

Briefly, in accordance with another aspect of the present invention, there is provided yet another optical transmitter. The optical transmitter includes a mechanism for generating an optical beam that is narrow in a first plane and diverges in a known way in a second plane, and a mechanism for rotating the optical beam. The optical transmitter further includes a mechanism for emitting a synchronization signal at a specific rotational position of the optical beam.

Briefly, in accordance with another aspect of the present invention, there is provided still another optical transmitter. The optical transmitter includes a mechanism for generating a first optical beam that is narrow in a first plane and diverges in a first known way in an orthogonal plane, and a mechanism for generating a second optical beam that is narrow in a second plane and diverges in a second known way in a second orthogonal plane. The optical transmitter further includes a mechanism for rotating the first optical beam and the second optical beam, wherein the first and second optical beams are in a fixed spatial relationship.

It is to be understood that the foregoing general description and the following detailed description are exemplary and explanatory only and are not restrictive of the invention as claimed.

BRIEF DESCRIPTION OF THE DRAWINGS

The accompanying drawings, which are hereby incorporated by reference, illustrate embodiments of the invention and together with the description serve to explain the principles of the invention.

DETAILED DESCRIPTION OF THE PREFERRED EMBODIMENT

The description which follows is of an optical transmitter which can be used, for example, in a position location system or a position measurement system. The term "position location system" is often used to refer to a system which is capable of locating a point, a line, or a plane in three-dimensional space, and the term "position measurement system" is often used to refer to a system which is capable of locating a point in space. However, these terms are used more generally in this disclosure to refer to any system which can utilize an optical transmitter, and the terms are not to be construed as limiting the application of the present invention. Examples of systems which can utilize an optical transmitter include systems for determining points, lines, planes, distances, areas, volumes, angles, or any other spatial or positional variable.

Reference will now be made in detail to the presently preferred embodiment of the invention. Wherever possible, the same reference numbers will be used throughout the drawings to refer to the same or like parts.

Figure 1:
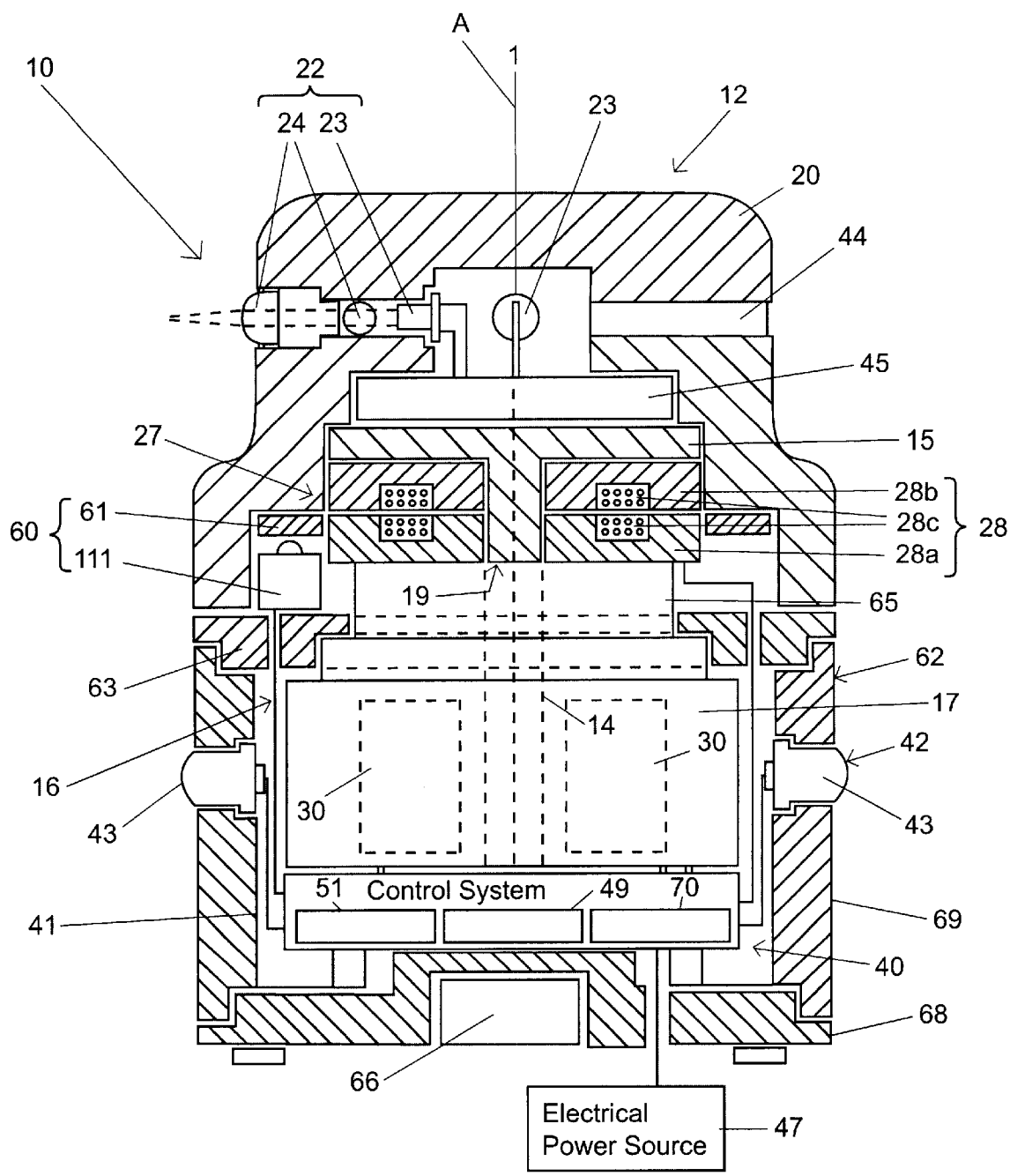
FIG. 1 is a partial cross sectional view of an optical transmitter in accordance with the present invention.
Figure 2:
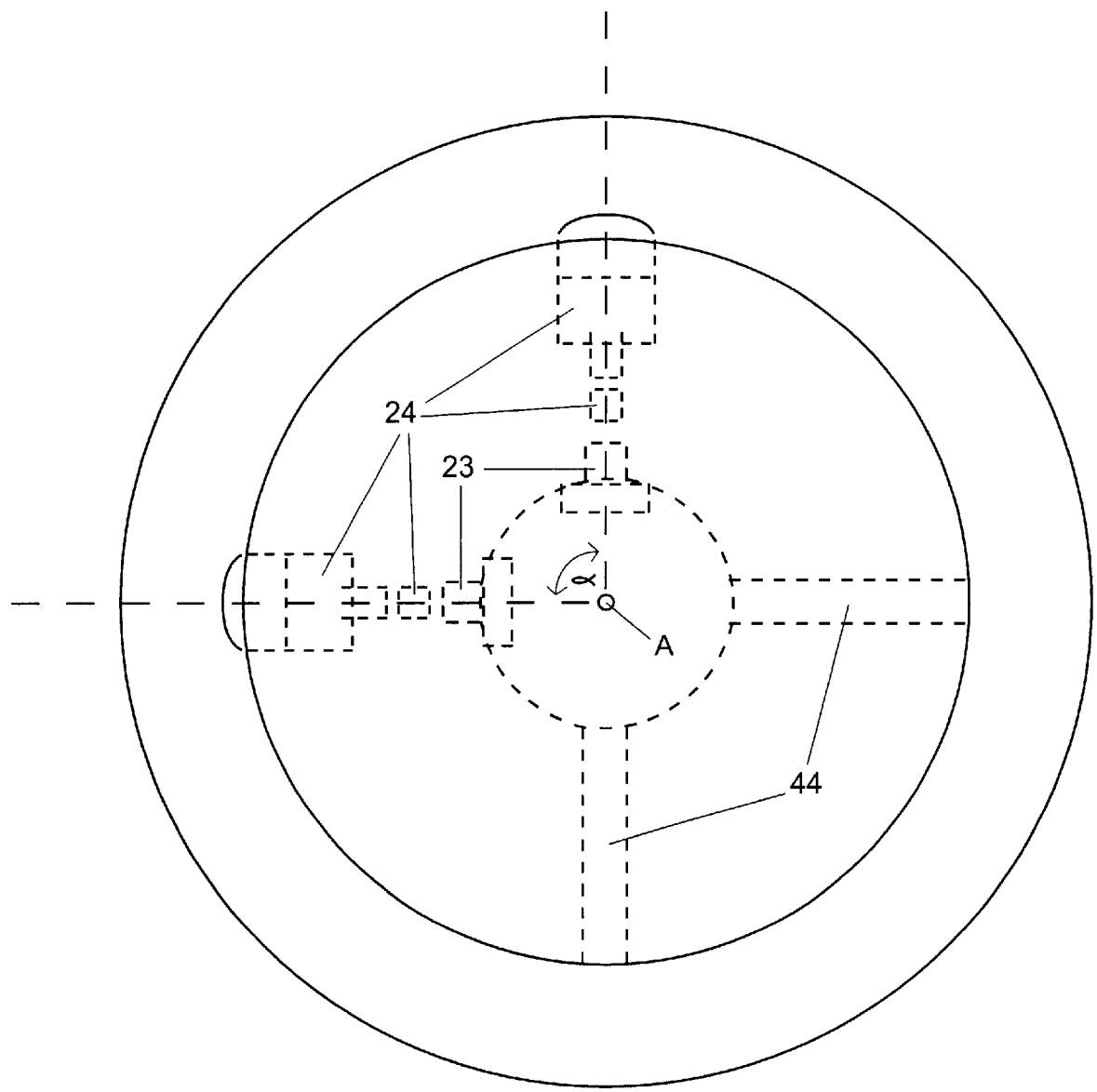
FIG. 2 is a top view of a rotating head assembly of the optical transmitter of FIG. 1.

FIGS. 1 and 2 show an optical transmitter 10 in accordance with the invention. In general, the optical transmitter 10 includes a rotating head assembly 12, a rotary power source 16, and an electrical system 40.

The rotating head assembly 12 has one or more optical sources 22 fixed within an optics-retaining member 20. Counterbalance holes 44 can be provided within the optics-retaining member 20 to balance the rotating head assembly 12 and prevent vibration. The counterbalance holes 44 also provide access to the inside of the optics-retaining member 20 to facilitate installation of the optical sources 22.

Each optical source 22 preferably emits a substantially planar beam, i.e., a beam that diverges along a plane and remains very narrow ("flat") in a direction orthogonal to the plane. A preferred optical source 22 that can provide such a beam includes, for example, a solid state infrared laser 23 (e.g., wavelength of 780 nm) combined with one or more lenses 24. Although collimated optical beams are suitable, other beams can also be used. For example, a light emitting diode could be substituted for the laser 23. In the preferred embodiment, the rotating head assembly 12 includes first and second optical sources 22 that produce respective first and second substantially planar beams. As discussed earlier, it is important to control the shape of the beams, and the beams are preferably of a precisely controlled shape. One or more additional optical sources that generate additional beams with precisely controlled shape may also be incorporated into the rotating head assembly 12.

To facilitate use of the optical transmitter 10 in a position location system, each of the first and second beams preferably defines a plane that intersects the rotational axis A of the rotating head assembly 12 at a tilt angle of thirty degrees, although other tilt angles could be employed. The planes defined by the first and second beams are preferably tilted in opposite directions. Furthermore, the optical sources 22 are offset at a separation angle α when viewed from the axis of rotation of the rotating head assembly 12 (see FIG. 2). Separation angle α is preferably greater than sixty degrees and more preferably, is ninety degrees, although other angles could be used.

The divergence angle, also called the fan angle, of the planar laser beams can be adapted to suit the application for the position location system. Where measurements are made at long distances from the transmitter, in or close to a horizontal plane through the transmitter with the transmitter rotational axis vertical, a narrow divergence angle can be used that concentrates the energy in the laser beam around the horizontal plane. Where measurements are made over a wide range of elevations, a wide divergence angle can be used, which spreads the laser beam energy over a large volume surrounding the transmitter. It is also possible to control the energy distribution of the optical beam in space by adjusting the tilt angle of the beam.

As in known to one of ordinary skill in the art, virtually any divergence angle can be achieved. Divergence angles of less than one degree are used in many positioning systems to produce a spot at a distance. Larger divergence angles of between approximately ten degrees and ninety degrees are more suited to the preferred embodiment, and a divergence angle of approximately seventy degrees is preferred. As is also known to one of ordinary skill in the art, beams can diverge in a variety of ways.

The rotating head assembly 12 of the improved transmitter 10 can include two pairs of optical sources 22, one pair providing beams that have a small divergence angle for long range use and another pair providing beams with a wide divergence angle for short range use over a wide range of elevation angles. With suitable control electronics in the transmitter 10, the user can select which pair of beams are turned on, or the beams may utilize different optical wavelengths that can be recognized by the optical sensor of the position location system.

The rotary power source 16 produces rotary power to cause rotation of the rotating head assembly 12. The rotary power source 16 can include a motor 17 and a transmission 19 that transmits rotary power from the motor 17 to the rotating head assembly 12. The power source 16 drives the rotating head assembly. 12 at a constant angular velocity. Alternatively, the power source 16 drives the rotating head assembly 12 with a velocity that varies over each rotation with a known and predictable variation.

The motor 17 preferably is a direct current, brushless motor having a stator 30 and a rotor 14 and that is driven by an alternating current waveform, preferably a sine wave to minimize torque ripple in the motor. Torque ripple can cause variation of the angular velocity of the rotating head. The motor 17 should have minimal free play in its bearings, e.g., it could use high quality ball races or air bearings (not shown), to prevent precession of the rotor 14, since precession can lower the accuracy of position location systems.

In the preferred embodiment, the motor 17 is provided within a lower housing 62. The lower housing 62 includes a mounting and support plate 63, an outer portion 69, and a base portion 68 with a mounting point 66, such as a threaded hole, for securely mounting the optical transmitter 10 in a fixed position. A casing 65 of the motor 17 is preferably mounted to the plate 63.

An extended, flanged portion 15 of the rotor 14 extends from the lower housing 62 and forms the transmission 19, which transmits rotary power from the motor 17 to the rotating head assembly 12. The flanged portion 15 is preferably press fitted into the optics-retaining member 20.

The electrical system 40 transfers electrical power from an electrical power source 47, such as batteries or an external source of low voltage power, to the motor 17 and to the optical sources 22. As shown in FIG. 1, the electrical system 40 includes a control system 41, a power transfer device 27, and a power supply electronics unit 45.

The control system 41 is electrically connected to the electrical power source 47 and governs the flow of electrical power in the electrical system 40. The control system 41 preferably includes, among other things, a motor control portion 49 that controls the flow of electrical power to the motor 17 to cause the motor and rotating head to turn at a constant, or at least a known, angular velocity. The control system 41 also preferably includes an optical-source control portion 51 that controls the flow of electrical power to the optical sources 22. The control system may also, or alternatively, modulate the emitted power of the optical beam.

The motor control portion 49 receives angular velocity information from an encoder 60, although other sources of angular velocity information, such as a tachometer, could be used. The encoder 60 can include an optical encoder disk 61, such as a reflecting type disk, mounted on the optics retaining member 20 and a disk read electronics unit 111 mounted on the plate 63. A conventional closed loop feedback control circuit in the motor control portion 49 uses the angular velocity information received from the encoder 60 to govern the supply of electrical power to the motor 17 so as to maintain the rotor 14 at a constant angular velocity.

The optical-source control portion 51 preferably includes conventional circuitry that governs the flow of power to the optical sources 22 so as to control the operation of the optical sources 22 to maintain the emitted optical power at a constant level.

In the electrical system 40, the power transfer device 27 transmits electrical power from the optical-source control portion 51 of the control system 41 to the rotating optical sources 22. It is presently preferred that the power transfer device 27 include a rotary transformer 28 and, more preferably, a pot-core type rotary transformer formed from a ferrite material.

The rotary transformer 28 shown in FIG. 1 has a stationary portion 28a that is mounted on the casing 65 of the motor 17 and a rotating portion 28b that is rigidly fixed to and rotates in unison with the rotating head assembly 12. The stationary portion 28a and rotating portion 28b are concentrically mounted relative to each other and are separated by a small air gap.

The optical-source control portion 51 of the control system 41 supplies alternating current at a high frequency to the stationary portion 28a through a conventional electrical connection. The alternating current in the stationary portion 28a is converted to alternating current in the rotating portion 28b by magnetic coupling through the ferrite material in the cylindrical core portions 28c of the rotary transformer 28.

As the rotating portion 28b rotates, magnetic coupling does not vary because the rotating portion 28b rotates about the axis of the cylindrical core portions 28c. Hence there is no torque ripple or variation in output voltage due to rotation. Since torque ripple causes fluctuation in the angular velocity of the shaft 14, it is highly undesirable in an optical transmitter used for position location. Other power transfer devices, such as slip rings or a small electrical generator, could be used instead of the rotary transformer. These devices, however, have a greater tendency to produce torque ripple.

Certain embodiments of the optical transmitter 10 may use any of a variety of known techniques and/or devices to power the optical sources 22 in the rotating head assembly 12. Such techniques and/or devices can include, for example, slip rings, induction using the rotation of the rotating head assembly 12, capacitive coupling, radio frequency transmission of power directly to the rotating head assembly 12, reception of sunlight or other light at the rotating head assembly 12, and the provision of a battery either external or internal to the rotating head assembly 12. Clearly, the power transfer device 27 and/or the optical-source control portion 51 may be incorporated in the rotating head assembly 12 as required in these embodiments.

The power supply electronics unit 45 receives the alternating current voltage from the rotating portion 28b of the rotary transformer 28 and converts it to a suitable direct current voltage that is supplied to the optical sources 22. The power supply electronics unit 45 is preferably contained within the rotating head assembly 12.

To facilitate use of the optical transmitter 10 in a position location system, a signaling unit 42 can be provided that will emit a synchronization signal based on a rotational position of the rotating head assembly 12. For example, based on signals received from the index of the encoder 60, the signaling unit 42 can emit a synchronization signal. A signaling unit control portion 70 in the control system 41 can issue a command to the signaling unit 42 to emit the synchronization signal.

The index of the encoder only provides a synchronization signal once per revolution. Other types of encoders could be designed which emit more frequent synchronization signals.

Additionally, transmitters can be built that divide the once per revolution signal and emit a synchronization signal less than once per revolution. Examples include a divide-by-two which emits a synchronization signal once per every two revolutions and a divide-by-three which emits a synchronization signal once per every three revolutions. Synchronization signals that are emitted once per revolution or once per two revolutions have proven the ability to support measurements on the order of ten seconds of arc.

In the preferred embodiment, the signaling unit 42 includes a plurality of infrared light emitting diodes (LEDs) 43 (e.g., wavelength of 890 nm) mounted in the outer portion 69 of the casing 62. The LEDs 43 are utilized to generate an optical synchronization signal that is transmitted through the surrounding environment. Preferably, enough LEDs 43 are provided to cover a desired arc of the casing 62 and to transmit a synchronization signal over a desired distance and volume of operation.

The signaling unit 42, however, could generate the synchronization signal by using a different optical-signal source, an electrical-signal source, or a radio-frequency-signal source. The synchronization signal can take a variety of forms, including, for example, a strobe, an asynchronous communication signal, and/or a synchronous communication signal. Additionally, instead of transmitting the synchronization signal through the surrounding environment, an optical synchronization signal could be transmitted through an optical fiber or an electrical synchronization signal could be transmitted through a wire to the portable position measurement sensor 46 in FIG. 3.

Figure 3:
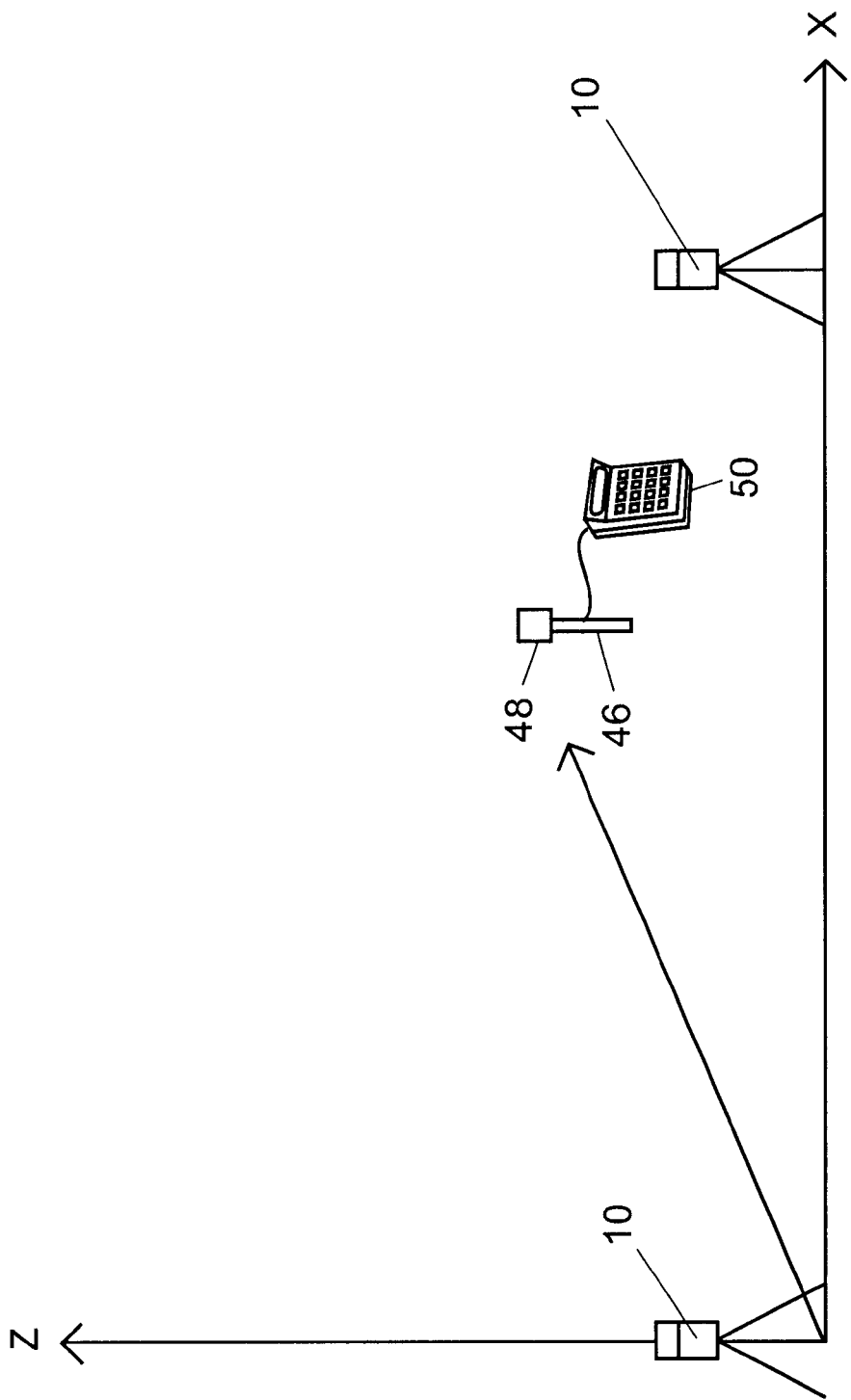
FIG. 3 is a perspective view of a position measurement system utilizing the optical transmitter of FIG. 1.

FIG. 3 illustrates a position measurement system utilizing the optical transmitter 10 of the present invention. In the illustrated embodiment, two optical transmitters 10 are located within a measurement field. Each optical transmitter 10 generates two substantially planar optical beams that sweep across the measurement field and are detected by a portable detector unit 46 equipped with a photodetector 48. The photodetector 48 also detects a synchronization signal transmitted by the signaling unit 42 of each optical transmitter 10. Detection signals generated by the photodetector 48 as a result of the detection of the optical beams and the synchronization signals are supplied to a processing unit 50, either directly coupled to the portable detector unit 46 or located at a remote location and connected to the portable detector unit 46 by a communication link. The processing unit 50 generates three-dimensional position data based on the detection signals.

The present invention provides an improved optical transmitter that gives a dramatic improvement in performance, and ease and cost of manufacture over previous optical transmitters intended for use in position location systems. The following paragraphs describe some of the advantages relative to certain previous transmitter embodiments.

One or more optical sources 22 and associated optical components, as shown in FIGS. 1–2, are rigidly mounted in the rotating head 12 of the transmitter 10. The optical sources 22 and optical components generate fan beams that retain their spatial relationship relative to the head 12 at all times. Provided that the transmitter 10 is rigidly mounted and employs high quality bearings in the motor, the optical beams from the improved transmitter 10 generate a fixed pattern of optical energy in space which does not vary as the optical beams are rotated. This ensures high accuracy in the determination of position by the associated position location system.

There is no window through which the optical beams must pass that is not fixed with respect to the optical beams. The presence of a window can lead to distortion or variation of the optical beams as they are rotated, which reduces the accuracy of the position location system. The manufacture and installation of a distortion free window would significantly increase the cost of an optical transmitter that has rotating beams.

Figure 4:
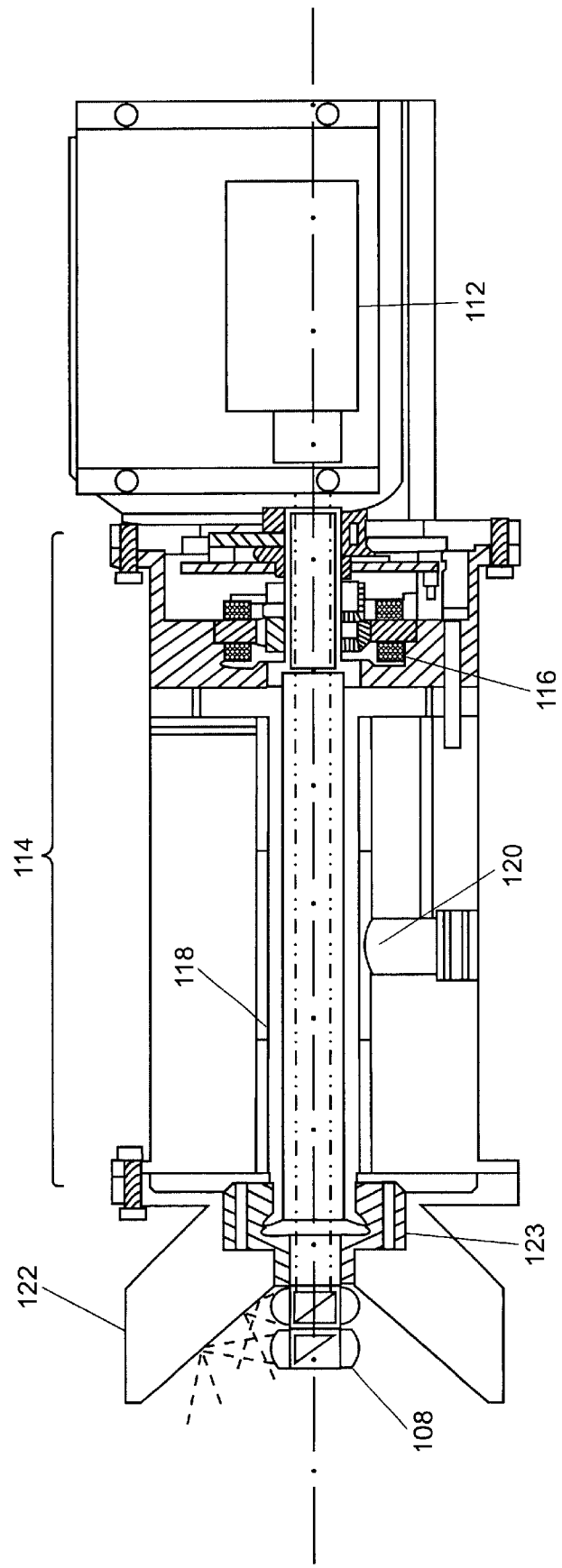
FIG. 4 shows a conventional optical transmitter.

The optical components in the rotating head 12 of the improved transmitter 10 are much fewer in number than in previous embodiments, reducing the cost of manufacture and alignment of the optical parts of the present transmitter 10. The optical path of the improved transmitter 10 is much less complex than that in existing optical transmitters (see, e.g., FIG. 4). In particular, the improved transmitter 10 does not have any mirrors, and this reduces the cost of manufacture, and the size and weight of the transmitter housing compared to previous embodiments.

The optical parts of the rotating head 12 form a hermetically sealed unit, allowing the remainder of the transmitter 10 to be constructed with a conventional casing. Previous embodiments required a large sealed case, with a consequent increase in the cost of manufacture relative to the present invention. A further advantage is that all of the optical elements are preferably fixed with respect to each other, including the optical source 22. This overcomes many of the problems associated with rotating sources or mirrors and the time-varying optical beams which can result. Although not preferred, embodiments in which all of the optical elements, such as, for example, a window, mirror, lens, or source, are not fixed with respect to each other are readily discernible to one of ordinary skill in the art.

The improved transmitter 10 has rotating parts with a lower total mass than in previous embodiments. This reduces the electrical power required by the motor, thus reducing the size and weight of the battery needed in portable applications.

An embodiment of a transmitter 10 has been described which utilizes two optical beams and a synchronization signal. Other embodiments include, for example, a transmitter which utilizes only a single optical beam along with a synchronization signal, and a transmitter which utilizes two optical beams and does not produce a synchronization signal. Each of these additional embodiments thus conveys information about elevation and/or azimuth through two transmissions, either two optical beams or one optical beam along with one synchronization signal. Typically, the optical beams convey elevation information and the synchronization signal together with an optical beam conveys azimuth information. For this reason, the synchronization signal can be referred to as an azimuth reference signal.

It will be apparent to those skilled in the art that various modifications and variations can be made in the above-described embodiment of the present invention without departing from the scope or spirit of the invention. For example, the number and placement of the optical sources within the rotating head assembly can be varied. As a further example, the rotating head assembly may have only a single optical source and optical components that divide an optical beam emitted by the single optical source. As further example, a single optical transmitter can be used to measure distance between the transmitter and an optical receiver with two or more optical sensors. A single transmitter can also be used with an optical receiver having three or more sensors to determine the orientation of the receiving system on the structure on which it is mounted. Yet another example includes positioning the optical sources 22 such that they cross the center point of the rotating head assembly 12, which allows a smaller diameter assembly 12 to be used. A further example includes moving the encoder 60 below the motor 17.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical transmitter for use with a position location system comprising:
    a rotating head assembly including a first powered optical source that generates a first optical beam that is narrow in a first plane and diverges in a known way in an orthogonal plane which is orthogonal to the first plane;
    a rotary power source for providing power to rotate the rotating head assembly at one or more known angular velocities; and
    a signaling unit for emitting a synchronization signal at a specific rotational position of the rotating head assembly.

2. The optical transmitter of claim 1, wherein the first optical beam is collimated in the first plane.

3. The optical transmitter of claim 1, wherein the signaling unit comprises at least one of an optical source, a radio frequency source, or an electrical source.

4. The optical transmitter of claim 1, wherein the signaling unit emits the synchronization signal over at least one of a wire, an optical fiber, or free space.

5. The optical transmitter of claim 1, wherein the signaling unit comprises at least one light emitting diode that emits the synchronization signal.

6. The optical transmitter of claim 1, wherein the signaling unit emits the synchronization signal at an interval selected from the group consisting of once per revolution of the rotating head assembly, once per two revolutions of the rotating head assembly, and once per three revolutions of the rotating head assembly.

7. The optical transmitter of claim 1, wherein all the optical elements which are included in the optical transmitter, and upon which the first optical beam impinges, are spatially fixed with respect to each other.

8. The optical transmitter of claim 1, wherein the rotating head assembly includes a second optical source that generates a second optical beam.

9. The optical transmitter of claim 1, further comprising a signaling unit control portion which controls the signaling unit.

10. The optical transmitter of claim 1, further comprising a motor control portion, wherein the rotary power source includes an electrically actuated motor, and wherein the motor control portion controls the electrically actuated motor.

11. The optical transmitter of claim 8, wherein the second optical beam diverges in a second known way in a second plane and is narrow in a second orthogonal plane which is orthogonal to the second plane.

12. The optical transmitter of claim 10, wherein the motor control portion controls the electrically actuated motor such that the rotating head assembly rotates with a constant angular velocity through each complete revolution of the rotating head assembly.

13. An optical transmitter for use with a position location system comprising:
    a rotating head assembly including a first optical source that generates a first optical beam that is narrow in a first plane and diverges in a known way in an orthogonal plane which is orthogonal to the first plane;
    a rotary power source for providing power to rotate the rotating head assembly at one or more known angular velocities;
    a signaling unit for emitting a synchronization signal at a specific rotational position of the rotating head assembly; and
    a power transfer device that transfers power to the first optical source of the rotating head assembly.

14. The optical transmitter of claim 13, wherein the power transfer device comprises at least one of a rotary transformer, slip rings, a capacitive coupler, an inductive coupler, a radio frequency receiver, a light receiver, or a battery.

15. The optical transmitter of claim 13, wherein the rotating head assembly comprises the power transfer device.

16. The optical transmitter of claim 13, wherein
    the power transfer device includes a stationary portion and a rotatable portion, and
    the power transfer device transfers electrical power from the stationary portion to the rotatable portion.

17. The optical transmitter of claim 16, wherein the power transfer device includes a rotary transformer.

18. An optical transmitter for use with a position location system comprising:
    a rotating head assembly including a first powered optical source that generates a first optical beam that diverges in a plane;
    a rotary power source for providing power to rotate the rotating head assembly at one or more known angular velocities; and
    a signaling unit for emitting a synchronization signal at a specific rotational position of the rotating head assembly;
    wherein the first optical source comprises a light emitting diode.

19. An optical transmitter for use with a position location system comprising:
    a rotating head assembly including a first powered optical source that generates a first optical beam that diverges in a plane;
    a rotary power source for providing power to rotate the rotating head assembly at one or more known angular velocities; and
    a signaling unit for emitting a synchronization signal at a specific rotational position of the rotating head assembly;
    wherein the first optical source comprises a laser.

20. An optical transmitter for use with a position location system comprising;
    a rotating head assembly including a first powered optical source that generates a first optical beam that diverges in a known way in a first plane, the rotating head assembly further including a second powered optical source that generates a second optical beam which also diverges in a known way in a second plane;
    a rotary power source for providing power to rotate the rotating head assembly at one or more known angular velocities; and
    a signaling unit for emitting a synchronization signal at a specific rotational position of the rotating head assembly;
    wherein the first and second optical sources are offset by a separation angle of greater than sixty degrees but not more than one hundred eighty degrees with respect to an axis of rotation of the rotating head assembly.

21. An optical transmitter for use with a position location system comprising:
   a rotating head assembly including a first powered optical source that generates a first optical beam that is narrow in a first plane and diverges in a known way in an orthogonal plane which is orthogonal to the first plane;
   a rotary power source for providing power to rotate the rotating head assembly at one or more known angular velocities;
   a signaling unit for emitting a synchronization signal at a specific rotational position of the rotating head assembly; and
   a motor control portion tat controls an electrically actuated motor in said rotary power source such that the rotating head assembly rotates with known varying velocities through each complete revolution of the rotating head assembly.

22. An optical transmitter for use with a position location system comprising:
   a rotating head assembly including
      a first powered optical source that generates a first optical beam that is narrow in a first narrow plane and diverges in a first known way in a first orthogonal plane which is orthogonal to the first narrow plane, and
      a second powered optical source that generates a second optical beam that is narrow in a second narrow plane and diverges in a second known way in a second orthogonal plane which is orthogonal to the second narrow plane, wherein said first and second optical sources are disposed such that said first optical beam and said second optical beam are spaced at a non-zero angular separation around an axis of rotation of said rotating head assembly; and
   a rotary power source for providing power to rotate the rotating head assembly at one or more known angular velocities.

23. The optical transmitter of claim 22, further comprising a power transfer device that transfers power to the first and second optical sources in the rotating head assembly.

24. The optical transmitter of claim 22, further comprising a signaling unit for emitting a synchronization signal at a specific rotational position of the rotating head assembly.

25. A method of transmitting an optical signal, the method comprising:
   providing a rotating head assembly having a fast powered optical source;
   generating, with the first optical source, a first optical beam that diverges in a first plane;
   rotating the rotating head assembly; and
   emitting a synchronization signal at a specific rotational position of the rotating head assembly.

26. The method of claim 25, wherein the first optical beam is collimated in the first plane.

27. The method of claim 25, further comprising:
   providing a second optical source in the rotating head assembly; and
   generating, with the second optical source, a second optical beam that is narrow in a second plane and diverges in a second known way in a second orthogonal plane which is orthogonal to the second plane.

28. The method of claim 25, wherein the second optical beam is collimated in the second plane.

29. The method of claim 25, wherein the orthogonal plane in which the first optical beam diverges has a tilt angle that is not equal to zero.

30. The method of claim 29, wherein the tilt angle is approximately thirty degrees.

31. The method of claim 27, wherein the first and second optical sources are offset by a separation angle of greater than sixty degrees with respect to the axis of rotation of the rotating head assembly.

32. A method of transmitting an optical signal, the method comprising:
   providing a rotating head assembly having a first optical source;
   generating, with the first optical source, a first optical beam that is narrow in a first plane and diverges in a known way in an orthogonal plane which is orthogonal to the first plane;
   rotating the rotating head assembly;
   emitting a synchronization signal at a specific rotational position of the rotating head assembly; and
   transferring electrical power from an electrical power source to the first optical source in the rotating head assembly.

33. The method of claim 32, wherein transferring electrical power includes transferring power from a stationary portion to a rotatable portion of a power transfer device.

34. A method of transmitting an optical signal, the method comprising:
   providing a rotating head assembly having a first powered optical source;
   generating, with the first optical source, a first optical beam that diverges in a first plane;
   rotating the rotating head assembly;
   emitting a synchronization signal at a specific rotational position of the rotating head assembly;
   providing a second powered optical source in the rotating head assembly; and
   generating, with the second optical source, a second optical beam that diverges in a second plane;
   wherein the first plane has a fist tilt angle, the second plane has a second tilt angle, and the first tilt angle is not equal to the second tilt angle.

35. A method of transmitting an optical signal, the method comprising:
   providing a rotating head assembly having a first powered optical source and a second powered optical source;
   generating, with the first optical source, a first optical beam that diverges in a first plane;
   generating, with the second optical source, a second optical beam that diverges in a second plane;
   disposing said first and second optical sources such that said first optical beam and said second optical beam are spaced at a non-zero angular separation around an axis of rotation of said rotating bead assembly; and
   rotating the rotating head assembly.

36. The method of claim 35, further comprising emitting a synchronization signal at a specific rotational position of the rotating head assembly.

37. An optical transmitter for use with a position location system comprising:
   means for generating an optical beam that is narrow in a first plane and diverges in a known way in a second plane which is orthogonal to the first plane;
   means for rotating the means for generating an optical beam;

means for transmitting power to said means for generating an optical beam while said means for generating an optical beam are rotating; and means for emitting a synchronization signal at a specific rotational position of the optical beam.

38. The optical transmitter of claim 37, wherein the means for generating the optical beam comprises an optical source, the means for rotating the optical beam comprises a rotary power source that is adapted to rotate the optical source at one or more known angular velocities, and the means for emitting a synchronization signal comprises a plurality of light emitting diodes.

39. The optical transmitter of claim 38, wherein the rotary power source rotates the optical source at a known pattern of velocities which varies with time.

40. An optical transmitter for use with a position location system comprising:

first means for receiving power and generating therefrom a first optical beam that diverges in a first plane;

second means for receiving power and generating therefrom a second optical beam that diverges in a second plane; and means for rotating the first optical beam and the second optical beam, wherein the first and second optical beams are in a fixed spatial relationship such that said first optical beam and said second optical beam are spaced at a non-zero angular separation around an axis of rotation of said rotating bead assembly.

* * * * *

UNITED STATES PATENT AND TRADEMARK OFFICE
CERTIFICATE OF CORRECTION

PATENT NO. : 6,452,668 B1 Page 1 of 1
DATED : September 17, 2002
INVENTOR(S) : Timothy Pratt et al.

It is certified that error appears in the above-identified patent and that said Letters Patent is hereby corrected as shown below:

<u>Title page,</u>
Item [75], please correct all inventors as follows:

-- Timothy Pratt, Blacksburg, VA (US)
  Scott C. Casteel, Fairfax, VA (US)
  Thomas M. Hedges, Great Falls, VA (US)
  Donald Todd, Leesburg, VA (US) --

<u>Column 11,</u>
Line 16, change "a motor control portion tat" to -- a motor control portion that --.
Line 49, change "providing a rotating head assembly having a fast" to -- providing a rotating head assembly having a first --.
Line 66, change "The method of claim 25," to -- The Method of claim 27, --.

<u>Column 12,</u>
Line 56, change "of rotation of said rotating bead" to -- of rotation of said rotating head --.

Signed and Sealed this

Fifth Day of August, 2003

JAMES E. ROGAN
*Director of the United States Patent and Trademark Office*